Jan. 12, 1926.
H. BUCHHOLZ
1,568,955
MOLDING MATERIAL
Filed Nov. 14, 1923
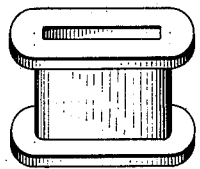
MOULDED FROM A
HEAT-PLASTICIZED COMPOSITION
CONTAINING
ACETYL CELLULOSE
POWDERED GLASS
BONE MEAL AND
MAGNESITE
WITNESS
G. V. Rasmussen
INVENTOR
HERMANN BUCHHOLZ
BY
Nielsen Schreuck
ATTORNEYS Patented Jan. 12, 1926.

1,568,955

UNITED STATES PATENT OFFICE.

HERMANN BUCHHOLZ, OF BERLIN, GERMANY.

MOLDING MATERIAL.

Application filed November 14, 1923. Serial No. 674,631.

*To all whom it may concern:*

Be it known that I, HERMANN BUCHHOLZ, a citizen of Germany, and resident of the city of Berlin, Germany, have invented a certain new and useful Improvement in Molding Materials, of which the following is a specification.

The invention relates to the production of molded articles of a variety of shapes and descriptions such as are generally made of vulcanized rubber, bakelite and other similar material and the object of the invention is to produce important results by the use of a composition of special characteristics.

A specimen product made in accordance with this invention is illustrated in the accompanying drawing.

A composition or material suitable for the purpose of being molded and of having the range of use of vulcanized rubber must possess many special characteristics, chief among which are ease of manipulation and molding, cheapness of material, cheap handling, resistance to moisture, permanence in color when exposed to light and weather, insulating resistance, etc. I have discovered a composition which satisfies the various requirements to a remarkable degree. The foundation of this new composition is a material known under trade designations such as Lonarit or Cellon, the essential ingredient of which is acetyl cellulose. Materials such as Lonarit or Cellon are generally made by dissolving acetyl cellulose in acetic acid and adding a filling material such as talc, ash, or the like, and some asphalt, tar, or pitch. The material is dried and powdered and is usually in a condition where it is fit for molding, but not for squirting through a die in accordance with the process used by me. Such material is not capable of resisting more than a moderate amount of heat and cannot endure temperatures such as 180° C. At these higher temperatures it becomes sticky. Taken by themselves these substances are too expensive for general use and they furthermore require to be pressed in special expensive molds and in those molds the material must remain for an extended period of time because it does not become rigid with sufficient speed. I have, however, found that if there is mixed with the acetyl cellulose foundation glass in the form of very fine powder or dust to the extent of say 10%, not only is the bulk of the material correspondingly increased, but it is also rendered correspondingly less expensive, powdered glass being an extremely cheap commodity. The glass furthermore acts to hasten the settling of the mass in the molds and consequently makes it possible to produce product at a speed which approaches the speed at which the molds can be filled. The acetyl cellulose material and the powdered glass are preferably mixed in a rotating barrel and the composition is brought to a form of extremely fine impalpable powder. It can then be introduced into a hopper and fed through an electrically heated cylinder to render the material fluid, whereupon a pressure plunger descending into the cylinder forces the fluid material into the mold, causing it to flow into every recess of the mold. On the return movement of the plunger the mold is separated from the feeding mechanism and when opened will contain a perfect replica of the shape of the mold.

My composition softens at about 80° C. and melts at about 120° C. so that simple heating instrumentalities to render the composition fluid are all that are required. For some purposes where smoothness of appearance is specially desired, a small percentage of animal glue, bone meal, gelatine or the like may be added. The volume of the composition can be further enlarged to reduce the cost thereof by the addition of an inexpensive material such as magnesite or burnt magnesia which when added also lowers the specific gravity of the product. The amount of glass dust to be added depends somewhat on the results to be obtained. The more glass is added the greater will be the heat resistance of the product, but too much glass dust will give the article a rough exterior. An excellent formula for producing results which are generally satisfactory for practically all purposes are one thousand parts acetyl cellulose material (of the Lonarit or Cellon type as hereinbefore described), ninety parts glass, sixty parts animal glue and fifteen parts magnesite.

The products produced in accordance with this invention are non-hygroscopic, exhibit excellent insulation qualities (for example a plate of 1 mm. thickness resists approximately 11,400 volts) the material endures the action of light, of the sun and of the weather and does not change color like hard rubber. It is cheaper than rubber. Any waste material or products broken in the mold do not require to be permanently discarded but can be re-melted and used over again. The material does not require molds operated under pressure, but can be introduced into the molds as described by the squirting method. The inner surfaces of the molds not being used as pressure exerting elements, are not destroyed, but endure for extremely long periods contrasted with the life of an ordinary two or more part mold brought together under pressure. It is apparent that each article to be manufactured will require a mold of its own according to differences in shape in the finished product.

Many changes and variations can be embodied in the execution of this invention without, however, departing from the essential characteristics thereof.

For example, the coloring of the product, although conventionally black, can be varied in any desired fashion. Then again, instead of employing an acetyl cellulose material (of the Lonarit or Cellon type as hereinbefore described) any other equivalent body may be used, provided it possesses the property of being non-inflammable, of becoming liquid at a temperature within the range of simple heating instrumentalities (say up to 300° C.) and of being moldable and of retaining the molded shape at all normal temperatures to which the products are exposed. When, therefore, in the claims I speak of acetyl cellulose, I intend to include equivalents.

I claim:

1. Material suitable for the formation of molded articles comprising in combination a major percentage of acetyl cellulose and a minor percentage of glass dust.

2. Material suitable for the formation of molded articles comprising in combination a major percentage of acetyl cellulose, a minor percentage of glass dust and a small quantity of animal glue.

3. Material suitable for the formation of molded articles comprising in combination a major percentage of acetyl cellulose and a minor percentage of glass dust, said composition being in the form of a fine impalpable powder.

4. A molded article being the shaped, congealed product of a composition comprising as its major ingredient acetyl cellulose and as its minor ingredient glass dust, said composition having been introduced into the mold under pressure as a heat-induced fluid.

5. A molded article being the shaped, congealed product of a composition comprising as its major ingredient acetyl cellulose and as minor ingredients glass and animal glue, said composition having been introduced into the mold under pressure as a heat-induced fluid.

In testimony whereof I have hereunto set my hand.

HERMANN BUCHHOLZ.